United States Patent
Dantus et al.

(10) Patent No.: US 10,971,881 B2
(45) Date of Patent: Apr. 6, 2021

(54) LASER PULSE INCLUDING A FLAT TOP

(71) Applicant: Board of Trustees of Michigan State University, East Lansing, MI (US)

(72) Inventors: Marcos Dantus, Okemos, MI (US); Vadim Lozovoy, Holt, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 307 days.

(21) Appl. No.: 15/936,534

(22) Filed: Mar. 27, 2018

(65) Prior Publication Data

US 2018/0219346 A1    Aug. 2, 2018

Related U.S. Application Data

(63) Continuation of application No. PCT/US2016/054349, filed on Sep. 29, 2016.

(60) Provisional application No. 62/236,212, filed on Oct. 2, 2015.

(51) Int. Cl.
| | |
|---|---|
| *G02B 26/00* | (2006.01) |
| *H01S 3/00* | (2006.01) |
| *H01S 3/10* | (2006.01) |
| *G02B 27/09* | (2006.01) |
| *H01S 3/16* | (2006.01) |

(52) U.S. Cl.
CPC ........ *H01S 3/0057* (2013.01); *G02B 27/0927* (2013.01); *G02B 27/0944* (2013.01); *H01S 3/10053* (2013.01); *H01S 3/0085* (2013.01); *H01S 3/1625* (2013.01); *H01S 3/1636* (2013.01)

(58) Field of Classification Search
CPC .................................................. H01S 3/0057

USPC .......................................................... 359/238
See application file for complete search history.

(56) References Cited

U.S. PATENT DOCUMENTS

| | | | | |
|---|---|---|---|---|
| 5,283,692 | A | * | 2/1994 | Herbst ................. G02B 5/0825 359/580 |
| 6,151,338 | A | * | 11/2000 | Grubb ................. H01S 3/10023 372/6 |
| 7,105,811 | B2 | | 9/2006 | Dantus et al. |
| 7,439,497 | B2 | | 10/2008 | Dantus et al. |

(Continued)

FOREIGN PATENT DOCUMENTS

| | | |
|---|---|---|
| CN | 101795127 A | 8/2010 |
| WO | WO-2011/011644 A2 | 1/2011 |

OTHER PUBLICATIONS

Wefers, M., et al., "Analysis of Programmable Ultrashort Waveform Generation Using Liquid-Crystal Spatial Light Modulators," J. Optical Society of America B, vol. 12, No. 7, pp. 1343-1362 (Jul. 1995).

(Continued)

*Primary Examiner* — James C. Jones
(74) *Attorney, Agent, or Firm* — Harness, Dickey & Pierce, PLC

(57) ABSTRACT

A laser pulse includes a flat top shape. Another aspects provides a method and system for creating laser pulse amplification with a flat top and/or square shape, by only using phase modulation. In yet another aspect, a method and system create a flat top and/or square-shaped laser pulse in a reversible manner such that the stretched spectrum can be recompressed to their original duration with essentially no loss of pulse energy. A further aspect includes a method of making a fixed optic capable to creating flat top or square pulse amplification.

37 Claims, 14 Drawing Sheets

(56) References Cited

U.S. PATENT DOCUMENTS

| | | |
|---|---|---|
| 7,450,618 B2 | 11/2008 | Dantus et al. |
| 7,567,596 B2 | 7/2009 | Dantus et al. |
| 7,583,710 B2 | 9/2009 | Dantus et al. |
| 7,609,731 B2 | 10/2009 | Dantus et al. |
| 7,973,936 B2 | 7/2011 | Dantus |
| 8,208,504 B2 | 6/2012 | Dantus et al. |
| 8,208,505 B2 | 6/2012 | Dantus et al. |
| 8,265,110 B2 | 9/2012 | Dantus et al. |
| 8,300,669 B2 | 10/2012 | Dantus et al. |
| 8,311,069 B2 | 11/2012 | Dantus et al. |
| 8,618,470 B2 | 12/2013 | Dantus et al. |
| 8,630,322 B2 | 1/2014 | Dantus et al. |
| 8,633,437 B2 | 1/2014 | Dantus et al. |
| 8,675,699 B2 | 3/2014 | Dantus et al. |
| 8,861,075 B2 | 10/2014 | Dantus et al. |
| 9,018,562 B2 | 4/2015 | Dantus |
| 9,048,632 B1 | 6/2015 | Dantus et al. |
| 9,202,678 B2 | 12/2015 | Dantus et al. |
| 2002/0015546 A1* | 2/2002 | Bhagavatula .......... G02B 6/124 385/10 |
| 2003/0099264 A1 | 5/2003 | Dantus et al. |
| 2004/0089804 A1 | 5/2004 | Dantus et al. |
| 2004/0233944 A1* | 11/2004 | Dantus ............... G01B 9/02091 372/25 |
| 2005/0021243 A1 | 1/2005 | Dantus et al. |
| 2005/0226286 A1 | 10/2005 | Liu et al. |
| 2005/0232317 A1 | 10/2005 | Dantus et al. |
| 2006/0056468 A1 | 3/2006 | Dantus et al. |
| 2006/0120418 A1* | 6/2006 | Harter ................ H01S 3/06754 372/30 |
| 2006/0187974 A1 | 8/2006 | Dantus |
| 2007/0025432 A1* | 2/2007 | Ozcan ................ G01M 11/3172 375/224 |
| 2008/0170218 A1 | 7/2008 | Dantus et al. |
| 2009/0122819 A1 | 5/2009 | Dantus et al. |
| 2009/0188901 A1 | 7/2009 | Dantus |
| 2009/0207869 A1 | 8/2009 | Dantus et al. |
| 2009/0238222 A1 | 9/2009 | Dantus et al. |
| 2009/0256071 A1 | 10/2009 | Dantus et al. |
| 2009/0257464 A1 | 10/2009 | Dantus et al. |
| 2009/0296744 A1 | 12/2009 | Dantus et al. |
| 2010/0123075 A1 | 5/2010 | Dantus et al. |
| 2010/0187208 A1 | 7/2010 | Dantus et al. |
| 2011/0122895 A1* | 5/2011 | Savage-Leuchs ..... H01S 3/1022 372/10 |
| 2011/0211600 A1 | 9/2011 | Dantus et al. |
| 2011/0273115 A1* | 11/2011 | Liu ....................... H05H 15/00 315/500 |
| 2012/0076504 A1 | 3/2012 | Dantus et al. |
| 2012/0147911 A1* | 6/2012 | Dantus ................. H01S 3/0057 372/25 |
| 2014/0058367 A1 | 2/2014 | Dantus |
| 2016/0189806 A1 | 6/2016 | Dantus et al. |

OTHER PUBLICATIONS

Rundquist, A., et al., "Pulse shaping with the Gerchberg-Saxton Algorithm," J. Optical Society of America B, vol. 19, No. 10, pp. 2468-2478 (Oct. 2002).

Sun, P., et al., "Femtosecond Pulse Imaging: Ultrafast Optical Oscilloscope," J. Optical Society of America A, vol. 14, No. 5, pp. 1159-1170 (May 1997).

Foster, M., et al., "Silicon-Chip-Based Ultrafast Optical Oscilloscope," Nature, vol. 456, pp. 81-85 (Nov. 6, 2008).

Duan, Xiyu, et al., "MEMS-based multiphoton endomicroscope for repetitive imaging of mouse colon," Biomedical Optics Express, vol. 6, No. 8, pp. 3074-3083, published Jul. 29, 2015.

Will, I., et al., "Generation of Flat-Top Picosecond Pulses by Coherent Pulse Stacking in a Multicrystal Birefringent Filter," Optics Express, vol. 16, No. 19, pp. 14922-14937 (Sep. 15, 2008).

Szipõs, R., et al., "Theory and Design of Chirped Dielectric Laser Mirrors," Applied Physics B, vol. 65, pp. 115-135 (1997).

Glebov, L., et al., "Volume-Chirped Bragg gratings: Monolithic Components for Stretching and Compression of Ultrashort Laser Pulses," Optical Engineering 53(5), 051514, 8 pages (May 2014).

"RP Photonics Encyclopedia—Encyclopedia of Laser Physics Technology," https://www.rp-photonics.com/chirped_mirrors.html, 6 pages (Sep. 25, 2015).

Weiner, A., et al., "Synthesis of Phase-Coherent Picosecond Optical Square Puslses," Optic Letters, vol. 11, No. 3, pp. 153-155 (Mar. 1986).

Weiner, A., et al., "High-Resolution Femtosecond Pulse Shaping," J. Optical Society of America B, vol. 5, No. 8, pp. 1563-1572 (Aug. 1988).

Xu, B., et al., "Quantitative investigation of the multiphoton intrapulse interference phase scan method for simultaneous phase measurement and compensation of femtosecond laser pulses," J. Optical Society of America, vol. 23, No. 4, pp. 750-759, (Apr. 2006).

Coello, Y., et al., "Interference without an interferometer: a different approach to measuring, compressing, and shaping ultrashort laser pulses," J. Optical Society of America B, vol. 25, No. 6, pp. A140-A150 (Jun. 2008).

Lozovoy, V., et al., "Direct measurement of spectral phase for ultrashort laser pulses," Optics Express, vol. 16, No. 2, pp. 592-597 (Jan. 21, 2008).

Oksenhendler, T., et al., "Pulse-Shaping Techniques Theory and Experimental Implementations for Femtosecond Pulses," www.intechopen.com, pp. 347-386 (Feb. 2010).

Weiner, A.M., "Femtosecond pulse shaping using spatial light modulators," Review of Scientific Instruments, vol. 71, No. 5, pp. 1929-1960 (May 2000).

Yakovlev, I. V., "Stretchers and compressors for ultra-high power laser systems," Quantum Electronics, vol. 44, No. 5, pp. 393-414 (Mar. 2014).

Vaupel, A., et al., "Concepts, performance review, and prospects of table-top, few-cycle optical parametric chirped-pulse amplification," Quantum Electronics, vol. 53, No. 5, 051507, 12 pages (May 2014).

Takasago, K., et al., "Generation of amplified picosecond square pulses for low emittance electron generation in photocathode RF-GUN," Conference on Lasers and Electro-Optics, 11 pages (May 2002).

Weiner, A. M., "Femtosecond Optical Pulse Shaping and Processing," Progress in Quantum Electronics, vol. 19, pp. 161-237 (1995).

* cited by examiner

LASER PULSE INCLUDING A FLAT TOP

CROSS-REFERENCE TO RELATED APPLICATIONS

This application is a continuation application of PCT International Patent Application Serial No. PCT/US2016/054349 filed on Sep. 29, 2016, which claims the benefit of U.S. Provisional Application No. 62/236,212 filed on Oct. 2, 2015, both of which are incorporated by reference herein.

FEDERAL FUNDING

This invention was made with government support under N00014-14-1-1008 awarded by the U.S. Office of Naval Research. The government has certain rights in the invention.

BACKGROUND

The present application relates generally to laser pulses and more particularly to causing a laser pulse to have a flat top.

Energy scaling of ultrafast lasers is limited by a self-action of an electromagnetic field propagating through optical media, manifested as self-phase modulation ("SPM") or self-focusing, which limits a peak intensity that can be transmitted. When the light pulses are ultrashort ($<10^{-12}$ second), the threshold for self-action is reached with very low energies. Therefore, while any type of stretching may work, the most compact pulse is one that maintains a fixed intensity that is just below the threshold. Stretched Gaussian pulses, such as those created by chirped pulse amplification ("CPA"), are therefore far from ideal.

A number of approaches have been theoretically explored in an attempt to generate square pulses starting with femtosecond pulses. A first approach used a pulse shaper that introduced a phase and amplitude mask in the frequency domain that corresponds to the Fourier transform of the square pulse in the time domain. This method was implemented using a microlithograhically etched mask and later using a liquid crystal spatial light modulator ("SLM"). See Weiner, A., et al., "Synthesis of Phase-Coherent Picosecond Optical Square Pulses," Opt. Lett. 11, 153-155 (1986), and Wefers, M., et al., "Analysis of Programmable Ultrashort Waveform Generation Using Liquid-Crystal Spatial Light Modulators," J. Opt. Soc. Am. B 12, 1343-1362 (1995). The main drawback to this approach is the resulting spectral narrowing caused by the amplitude mask. This prior method could not provide a viable alternative for CPA because of irreversible pulse broadening in the time domain.

Second, flat top 200 fs FWHM pulses were created using a phase mask that was found using both a genetic algorithm and a Gerchberg-Saxton algorithm. See Rundquist, A., et al., "Pulse shaping with the Gerchberg-Saxton Algorithm," J. Opt. Soc. Am. B 19, 2468-2478 (2002). However, for every input laser spectrum and final square pulse duration, the phase needs to be determined by the optimization algorithm which takes too long for commercial use.

Third, Will, I., et al., "Generation of Flat-Top Picosecond Pulses by Coherent Pulse Stacking in a Multicrystal Birefringent Filter," Opt. Express 16, 14922-14937 (2008), considers stacking pulse replicas one after the other in order to create a flat top pulse with a pulse duration equal to the number of pulses stacked in time. A disadvantage of this method, however, is that spectral interference among the replicas results in a sync-function spectrum of the output square pulse, which is much narrower than an input pulse spectrum.

Those in the industry recognize the need to create flat top or square shaped pulses. But the prior attempts to do so created too many associated problems that made such commercially impractical. These prior versions blocked or reduced some frequencies and made it almost impossible to recompress the modified pulse. For example, Weiner, A., et al., "High-Resolution Femtosecond Pulse Shaping," J. Opt. Soc. Am. B 5, 1563 (1988), disadvantageously reduced too much wavelength spectrum and lost a significant quantity of photons through linear interference, as can be observed in its FIG. 8.

SUMMARY

In accordance with the present invention, a laser pulse includes a flat top shape in the time domain. Another aspects provides a method and system for laser pulse amplification using a flat top and/or square shape, by only using phase modulation. In yet another aspect, a method and system create a flat top and/or square-shaped laser pulse in a reversible manner such that the stretched spectrum can be recompressed to their original duration with essentially no loss of pulse energy. A further aspect includes a method of making or using a fixed optic capable to creating a flat top or square pulse, and/or for angling the optic to create a ramped pulse. A method and system, including a controller and/or software instructions for creating a flat top and/or steeply ramped pulse, calculates a second derivative of a spectral phase which is proportional to an intensity of a laser pulse spectrum multiplied by a stretching factor.

The present method and system are advantageous over prior known attempts. For example, the present method and system require approximately three times less stretching than prior attempts. Furthermore, essentially no photonic energy is lost (i.e., other than minor losses due to transmission efficiency since the present phase phase-only approach does not require blocking of certain spectral frequencies) with the present method and system. Moreover, the present method uses a calculated approach to produce a flat top pulse versus prior learning algorithm methods which are less accurate and are sensitive to noise. A method of and system for stretching an initial pulse having an arbitrary spectrum to then generate a square pulse in time using nonlinear spectral phase modulation, is also provided. Generation of square pulses using spectral phase modulation is advantageous because the pulses can be recompressed to their original duration by applying the inverse spectral phase. Implementation of the present flat top and square pulse amplification will advantageously reduce the magnitude of stretching required to mitigate detrimental self-action processes, while also allowing for more compact and robust ultrashort pulsed laser systems. Additional advantages and benefits of the present method and system will become apparent from the following description and appended drawings.

BRIEF DESCRIPTION OF THE DRAWINGS

FIG. 4A shows a second derivative of the phase, equivalent to the local stretching; FIG. 4B shows a first derivative of the phase, equivalent to delay of the frequency components; and FIG. 4C shows a spectral phase required to convert the original pulse into a square pulse in the time domain. The x axis is duration and the y axis is amplitude.

DETAILED DESCRIPTION

Figure 1:
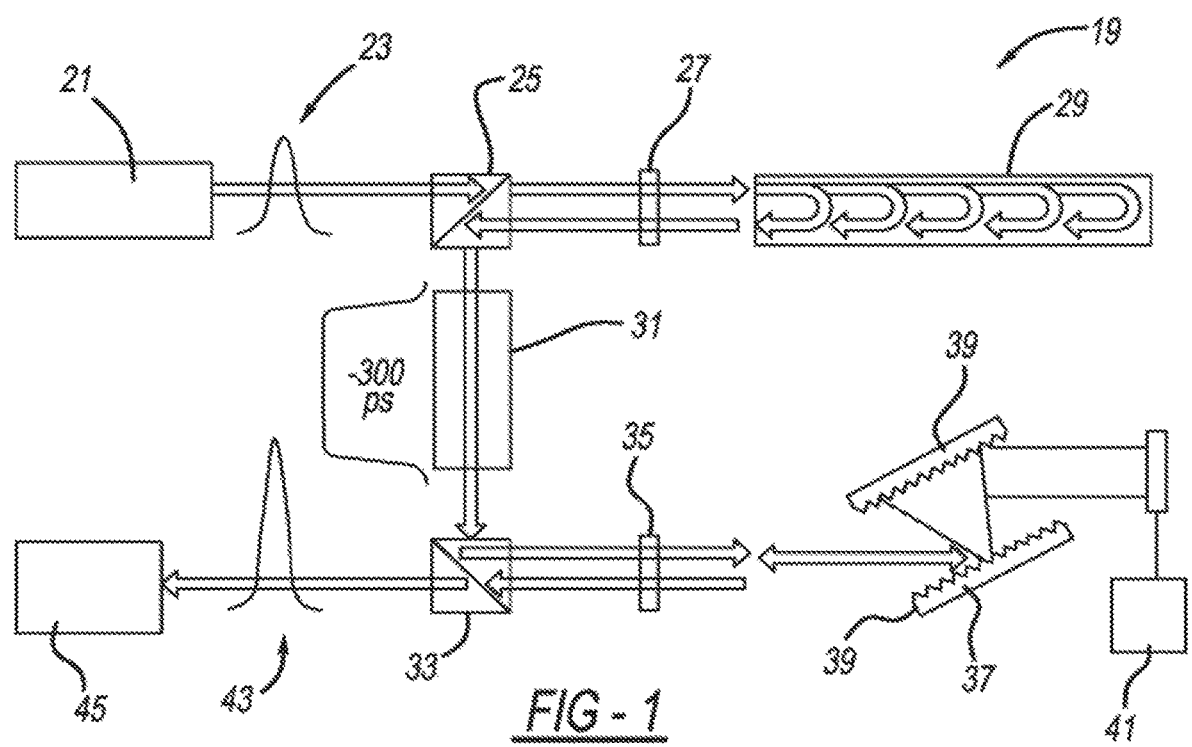
FIG. 1 is a diagrammatic view showing preferred hardware used with laser pulses of the present invention.

Referring to FIG. 1, a preferred laser system 19 employs a regenerative Ti:Sapphire, femtosecond seed laser 21 which emits multiple laser pulses 23. System 19 further includes a first polarizing beam splitter 25, a first λ/4 wave plate 27, a stretcher 29 (e.g., a square pulse stretcher that creates stretched pulses), an amplifier 31, a second polarizing beam splitter 33, a second λ/4 wave plate 35, and a shaper 37 including a pair of gratings 39. Shaper 37 is a spatial light modulator ("SLM") reflective type, which is programmably adaptive, and controlled and varied by a computer controller 41 connected thereto. Stretcher 29 is a square pulse amplifier ("SPA") tailored volume holographic grating ("VHG") type which is preferably fixed or nonadaptive. The duration of each pulse 23 is preferably less than 1 ns and more preferably less than 500 fs. The recompressed laser pulse 43 (which now looks the same as initial pulse 23) is then sent to an end-use device 45, such as an endoscope, as will be discussed in greater detail hereinafter. Alternatively, adaptive shaper 37 may be replaced by a fixed optic, as will be discussed in greater detail hereinafter.

Figure 2:
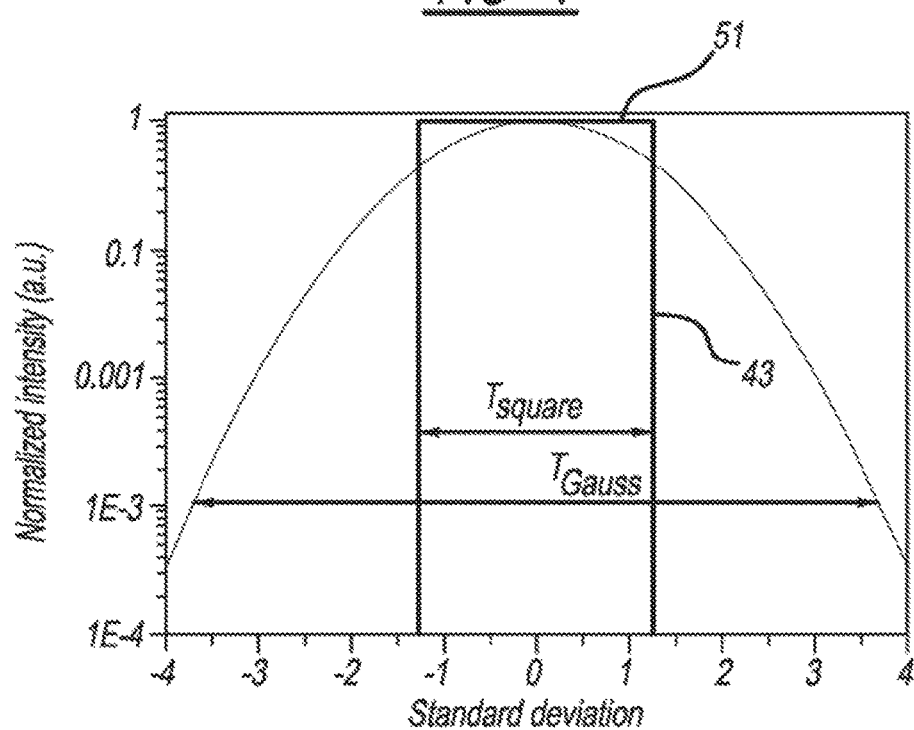
FIG. 2 is a graph showing simulated intensities of Gaussian and square pulses with equal peak power and FWHM as a function of time in units of Gaussian standard deviation. $T_{Square}$ and $T_{Gauss}$ are the bottom-to-bottom pulse durations for the square and Gaussian pulses, respectively.

The chirp process stretches all frequency components equally by an amount limited only by the gratings used. As can be observed in FIG. 2, for a starting Gaussian pulse emitted by a laser, the peak of the pulse is near the self-action threshold but the rest of the pulse is well below the threshold. Clearly, a different pulse shape would be able to satisfy the condition of maintaining peak intensity below the threshold while occupying a smaller temporal footprint. When the stated goal is to minimize pulse duration while not exceeding the self-action threshold, the optimum solution is a square shaped pulse with a flat top 51 of the present method and system. While the term "square" is used herein to denote the upper section of the pulse intensity shape in the time domain, it is intended to also include rectangular shapes with three connected and essentially perpendicular sides. The square pulse, with the same full-width at half maximum ("FWHM") as the Gaussian pulse, is three times shorter than the Gaussian pulse $T_{Gauss}$. This is most relevant to ultrafast laser pulses; therefore, the square pulse must maintain the entire spectral bandwidth of the original pulse since only such pulses can be re-compressed to their original pulse duration by introducing the inverse phase used to create them. FIG. 2 shows how such square pulses can be created starting from laser pulses 23 (see FIG. 1) with any spectral shape.

The phase-only generation of a stretched square pulse is based on the following theory. In the limit of large linear chirp, the temporal shape of a stretched pulse approaches its spectral intensity I(ω). In this case, the delay τ(ω)=dφ(ω)/dω is a linear function and its derivative, i.e. local stretching dτ(ω)/dω=dφ(ω)²/dω², is a constant. Therefore, all frequency components are linearly delayed or advanced and stretched equally such that the spectral shape is mapped to the pulse shape.

Figure 3A:
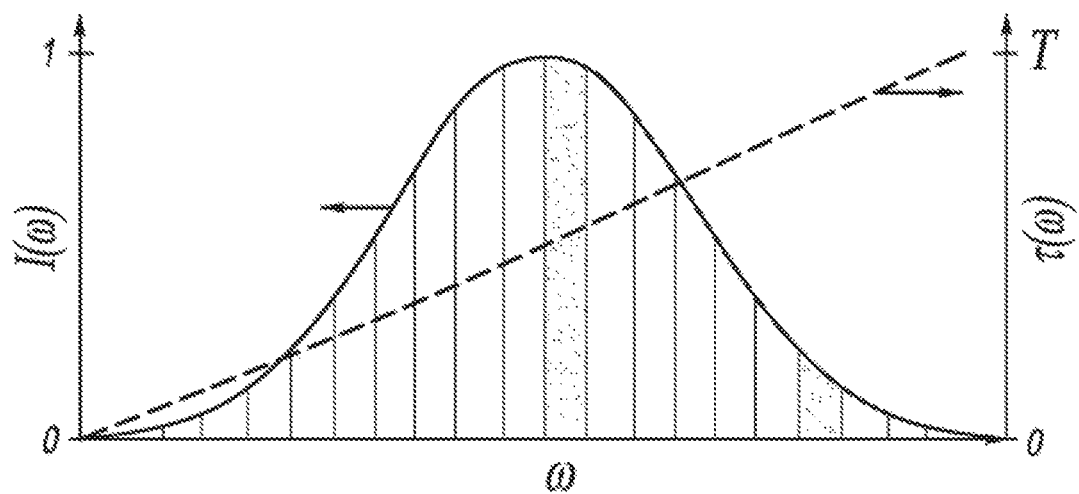
FIGS. 3A-3D are graphs showing pulse stretching with linear chirp (FIGS. 3A and 3B) or with a nonlinear function (FIGS. 3C and 3D) based on Equation (1). The dashed line corresponds to τ(ω).
Figure 3B:
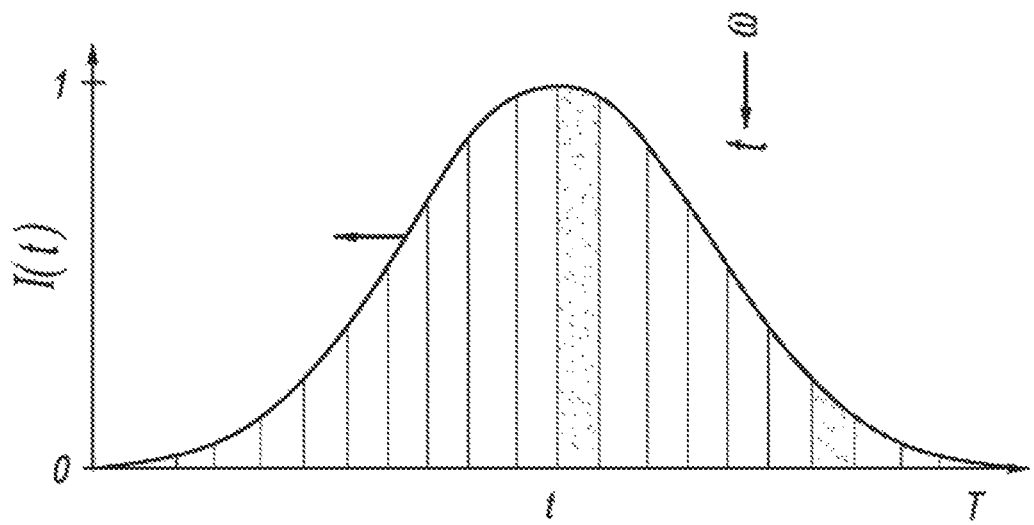
Figure 3C:
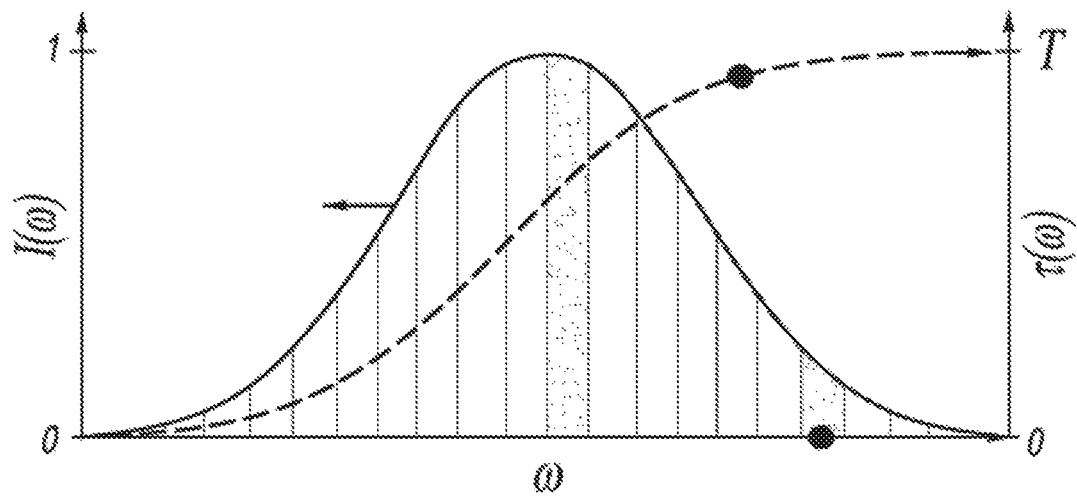
Figure 3D:
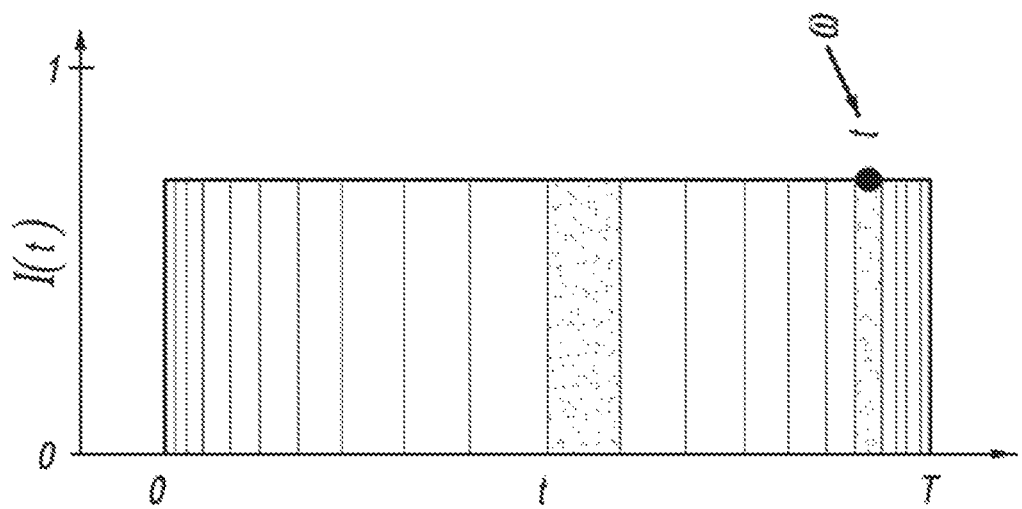

Consider a pulse with a Gaussian spectrum. Linear chirp stretches the pulse and its shape remains Gaussian (see FIGS. 3A and 3B). To make a square pulse, the local stretching dτ(ω)/dω must be adjusted to account for changes in spectral intensity: higher intensity requires more stretching, lower intensity—near the wings—requires less stretching (see FIGS. 3C and 3D). Therefore dτ(ω)/dω is proportional to the spectral intensity I(ω) of the pulse $$\frac{d\tau(\omega)}{d\omega} \equiv \frac{d^2\varphi(\omega)}{d\omega^2} \propto I(\omega), \qquad (1)$$

then the pulse shape becomes a square for any arbitrary spectrum I(ω).

Figure 4A:
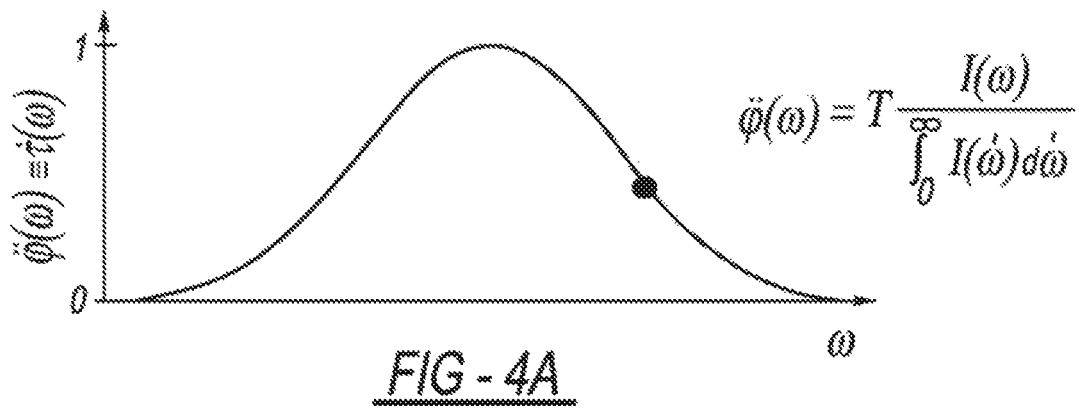
FIGS. 4A-4C are graphs showing phase modulation in the frequency domain to generate square pulses in the time domain, where.
Figure 4B:
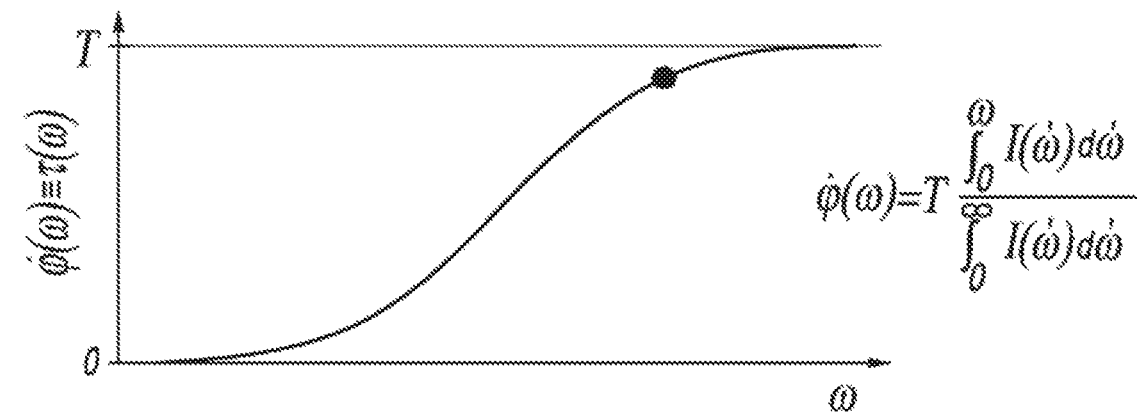

The duration of the stretched pulse is the difference between delay values for the limits $T=\tau(\omega_{max})-\tau(\omega_{min})$ as illustrated in FIG. 4B. To satisfy this condition for the pulse duration T, the delay and the spectral phase should have the following forms, respectively:

$$\tau(\omega) = \frac{d\varphi(\omega)}{d\omega} = T\frac{\int_0^\omega I(\omega')d\omega'}{\int_0^\infty I(\omega)d\omega} \quad (2)$$

$$\varphi(\omega) = \int_0^{\omega'} \tau(\omega')d\omega' \quad (3)$$

Figure 4C:
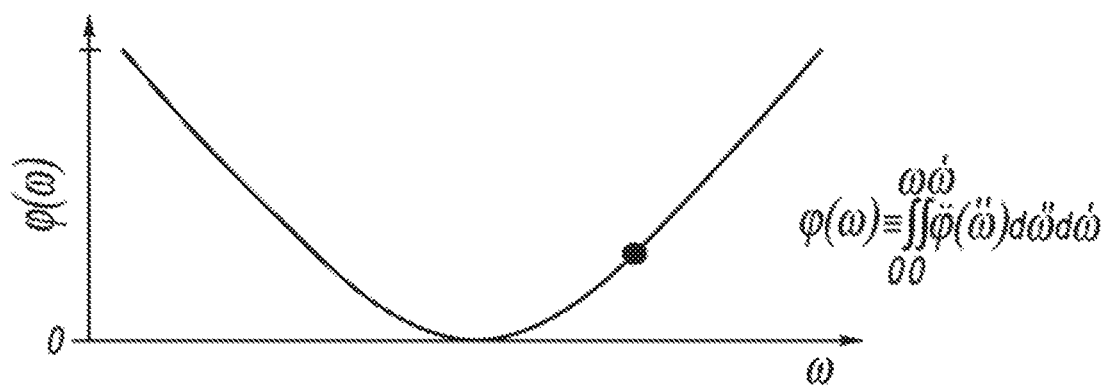

FIGS. 4A-C show numerical simulations of how the initial pulse spectrum is set equal to the second derivative of the phase (see FIG. 4A) and is used to determine the spectral delays (see FIG. 4B), which then are used to generate the spectral phase (see FIG. 4C). It is noteworthy that the direction of the frequency stretching can be reversed by using phase distortion with the opposite sign (i.e. positive to negative); this compresses the pulse to its original duration and shape.

The line of FIG. 4A corresponds to the spectrum of the input pulse. The desired phase to convert it into a square pulse has a second derivative which equals the normalized spectrum of the input pulse times a stretching factor T equal to the final duration of the square pulse. The line shown in FIG. 4B corresponds to the first derivative of the phase with respect to frequency. It also corresponds to the magnitude with which frequencies are delayed. The line of FIG. 4C corresponds to phase required to convert the input pulse into a square pulse of duration T.

Figure 5:
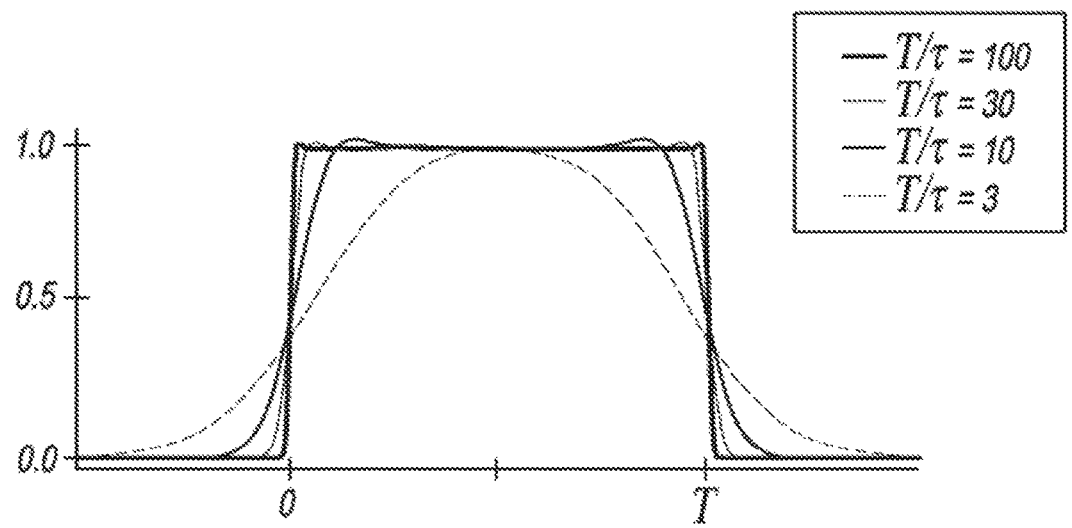
FIG. 5 is a graph showing pulses in the time domain with different stretching parameters.

The present method and system are expected to work well for large stretching ratios $T/\tau>10$, where $\tau$ is the initial pulse duration (FWHM). For smaller stretching ratios, the pulse profile is limited by the inherent rise time of the pulse. Pulse profiles are simulated for different stretching factors in FIG. 5, where the initial pulse duration $\tau$ is changed while keeping the final pulse duration T the same. Note that for $T/\tau>10$ this method should work very well.

Implementation of the present method using the equations given above in a laboratory situation uses a well calibrated pulse shaper that is capable of eliminating unwanted phase distortions (starting with a Fourier-limited pulse). Preferably a multiphoton intrapulse interference phase scan (MIIPS®) device and software are employed, which can be obtained from BioPhotonics Solutions, Inc. Such a MIIPS® system is disclosed in U.S. Pat. No. 8,675,699, entitled "Laser Pulse Synthesis System," U.S. Pat. No. 8,633,437, entitled "Ultra-Fast Laser System," U.S. Pat. No. 8,630,322, entitled "Laser System For Output Manipulation," U.S. Pat. No. 8,311,069, entitled "Direct Ultrashort Laser System," U.S. Pat. No. 8,300,669, entitled "Control System And Apparatus For Use With Ultra-Fast Laser," U.S. Pat. No. 8,208,504, entitled "Laser Pulse Shaping System," and U.S. Pat. No. 7,609,731, entitled "Laser System Using Ultra-Short Laser Pulses," all of which were invented or co-invented by M. Dantus et al., and are incorporated by reference herein.

An exemplary experimental laboratory setup includes a Ti:Sapphire oscillator (such as the Micra model from Coherent, Inc.), a pulse shaper (such as the FemtoFit™ from BioPhotonic Solutions, Inc.), and a Ti:Sapphire regenerative amplifier (such as the Legend model from Coherent, Inc.). The output is split into two beams that form a cross-correlator. A first beam goes through an optical delay line and a second beam goes through a second pulse shaper (such as a MIIPS® Box640 PA model from BioPhotonic Solutions, Inc.) where the desired phase is introduced. Both beams are then focused in a nonlinear crystal (such as a KDP crystal) by a 400 mm focal length lens. The second-harmonic signal is recorded with a spectrometer (such as a USB 4000 model from Ocean Optics). Pulses in both beams are first compressed to transform limited duration (40 fs at FWHM) by running the MIIPS® method in the two pulse shapers.

Figure 6:
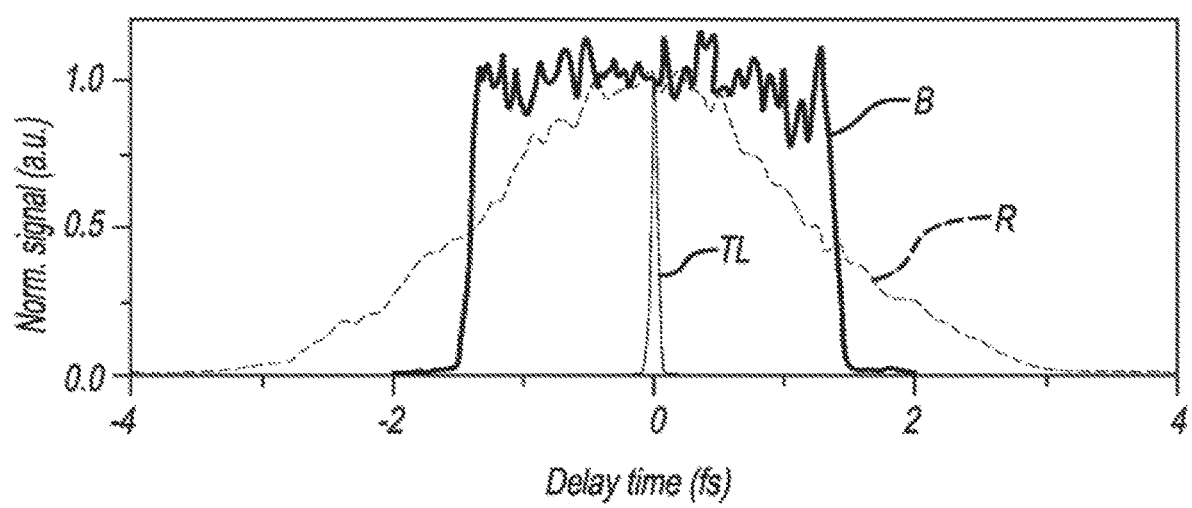
FIG. 6 is a graph showing expected cross-correlation measurements illustrating integrated SHG intensity for an input transform limited pulse (TL), a linearly chirped pulse (R) and the square pulse (B), as a function of delay.

Expected laboratory results of square pulse generation are shown in FIG. 6, where curve B shows a cross-correlation measurement of the resulting square pulse. Curve TL shows the cross-correlation of the input transform-limited pulses, and curve R shows linearly chirped pulse with $-39,000$ fs$^2$. Both square and linearly chirped pulses have the same peak power and energy. A phase mask for the square pulses is calculated according to Equation (1) hereinabove using the experimental laser spectrum and selecting the desired duration. The phase is introduced by the second pulse shaper. The square pulse distributes more evenly the peak intensity. Note that phase modulation does not affect the SHG laser pulse spectrum or the fundamental (800 nm wavelength range) spectrum.

Figure 7:
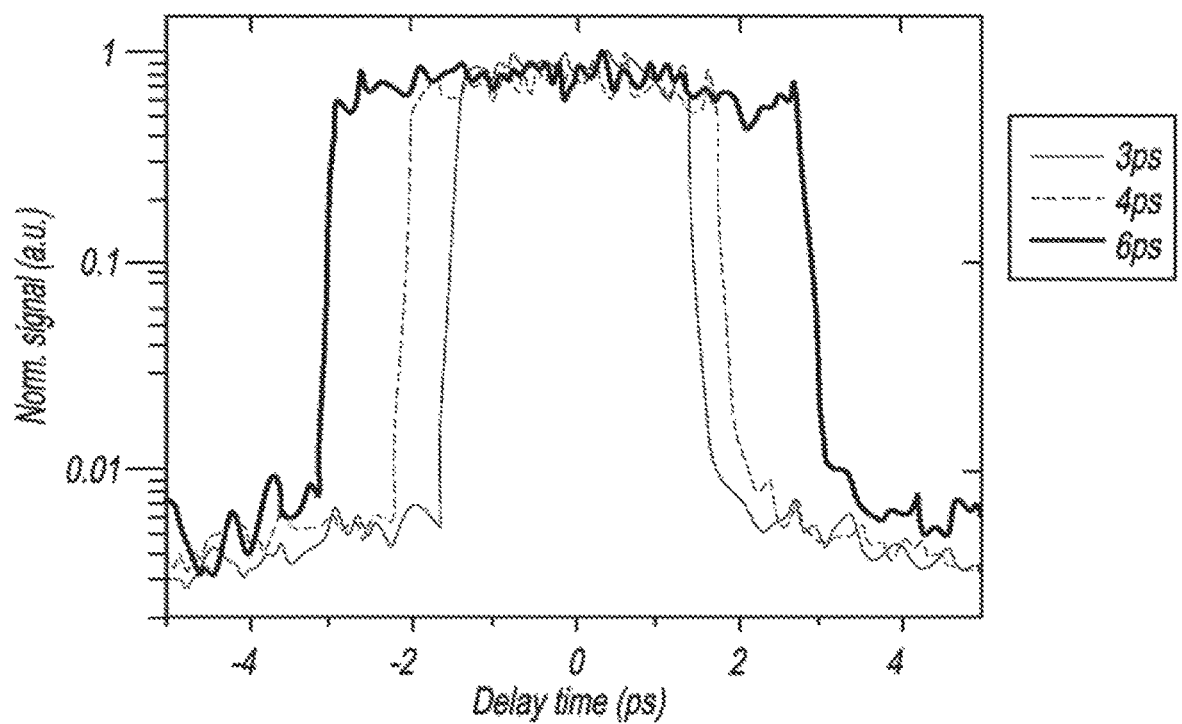
FIG. 7 is a graph showing expected cross-correlation measurements on a logarithmic scale of square pulses with 3 ps, 4 ps and 6 ps pulse duration where input pulses had a pulse duration of 40 fs.
Figure 8:
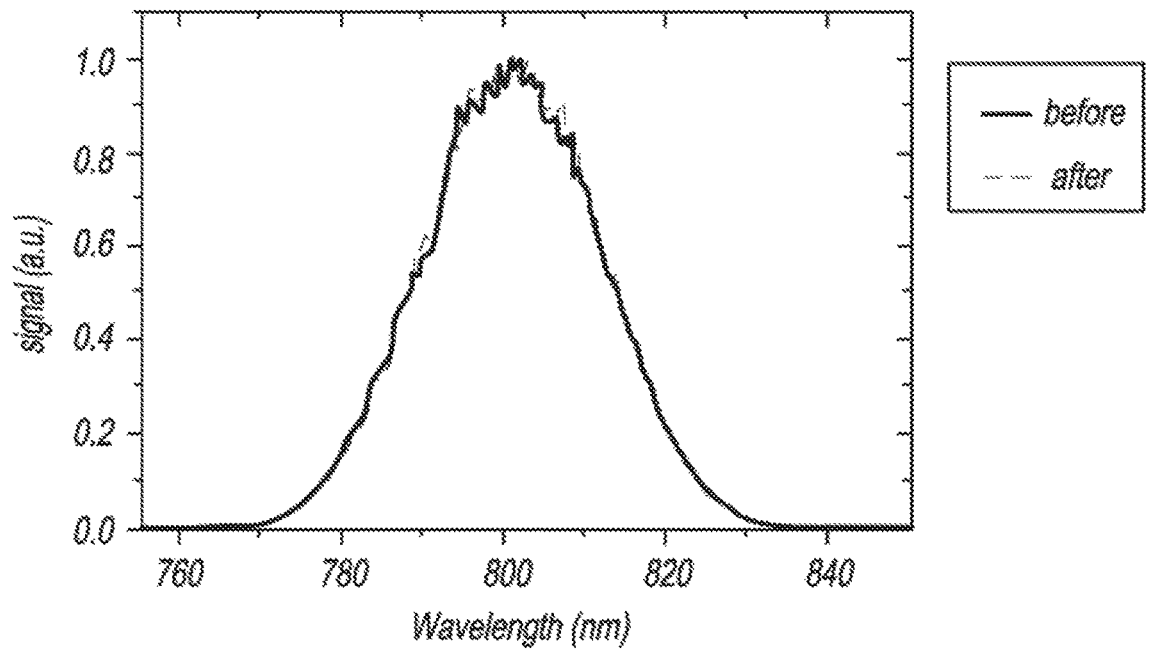
FIG. 8 is a graph showing an expected fundamental laser spectrum before and after 10× stretching depicting the phase required to create square pulses does not affect the pulse spectrum.

The present method described for generating square pulses is only limited by the number of pixels in the pulse shaper. A non-pixelated device such as a deformable mirror does not have this limitation. The maximum stretching factor $T_{max}/\tau$ equals the number of pixels within the FWHM of the laser spectrum. Expected results for stretching a 40 fs pulse 75, 100 and 150 times can be observed in FIGS. 7 and 8. The expected results are plotted in logarithmic scale to show the very sharp turn on-off of the pulses and the low background without satellite pulses. No additional special effort was made to reduce the background level below 1% beyond the square pulses. FIG. 8 shows that the present method for creating stretched square pulses should not affect the fundamental laser spectrum (i.e., the spectrum is essentially the same before and after stretching), therefore, the pulses can be recompressed.

Figure 9:
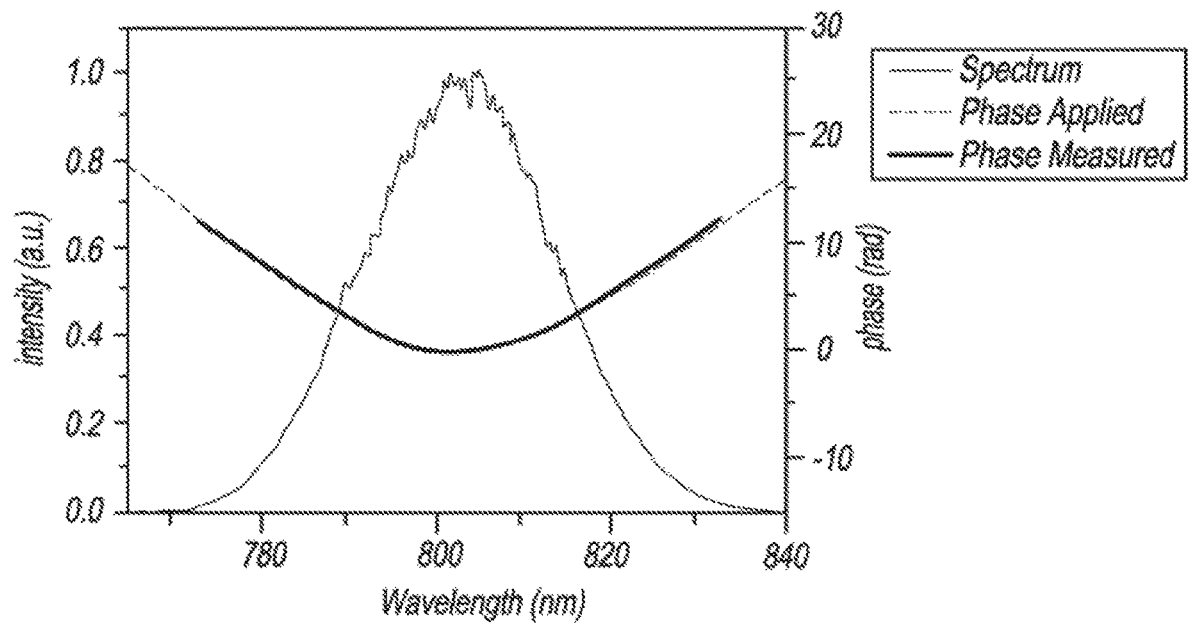
FIG. 9 is a graph showing an expected spectrum, where the spectral phase introduced by a first pulse shaper creates a 10× square pulse after amplification, and the spectral phase measured and used by a second pulse shaper recompresses the pulses.
Figure 10:
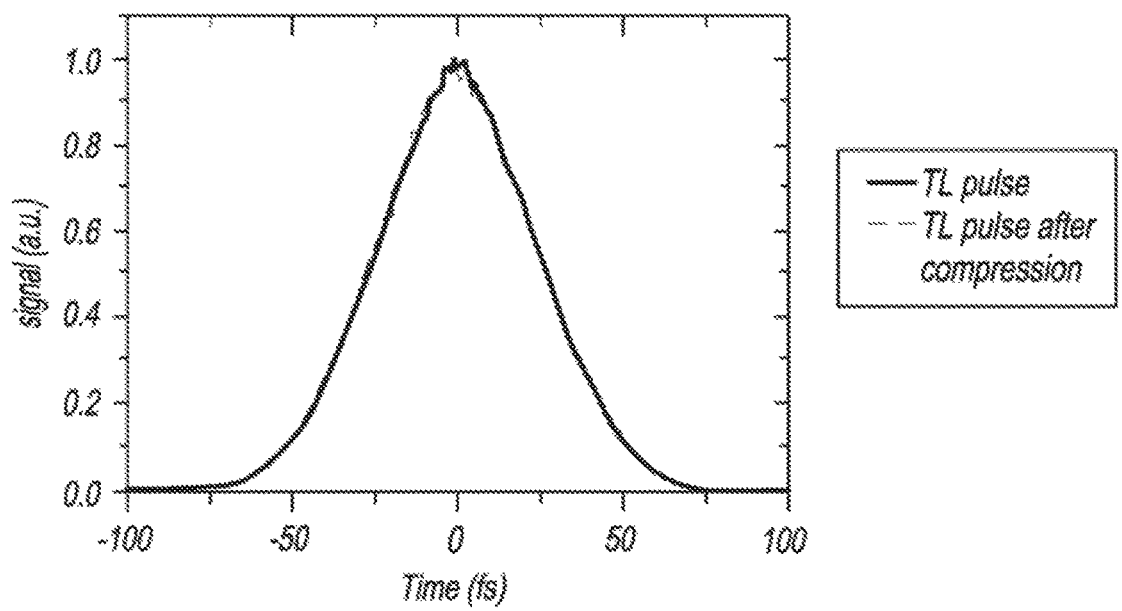
FIG. 10 is a graph showing an expected autocorrelation of the amplified laser output pulses without stretching (TL) and after 10× square-pulse stretching by the first pulse shaper, amplification, and compression by the second pulse shaper to TL duration.

Again, one of the advantages for the present phase-only square pulse generation is that the pulses can be fully recompressed. This hypothesis is analyzed by introducing the phase desired to create 10× stretched pulses at the output of the amplifier using the first pulse shaper. The second pulse shaper is then used to recompress the pulses. In FIG. 9, the phase applied by the first pulse shaper, and the phase retrieved by the second pulse shaper in order to recompress the pulses. Note that it is essentially the same phase as introduced by the first pulse shaper. FIG. 10 shows the autocorrelation of the pulses without stretching, and after stretching by the first pulse shaper and recompression by the second pulse shaper.

From a practical sense, while the use of a dedicated pulse shaper is ideal for the laboratory implementation of the approach presented here to create stretched square pulses, having an analytic solution should simplify the implementation of this approach in a commercial production setting for stretching and compressing ultrafast pulses using specially designed dispersive optics such as chirped mirrors and volume/fiber Bragg gratings that take into account the spectrum of the input pulse. Alternately, combinations of static optics or specially designed mirrors with the desired curvature for stretching and re-compression may be employed.

Figure 13:
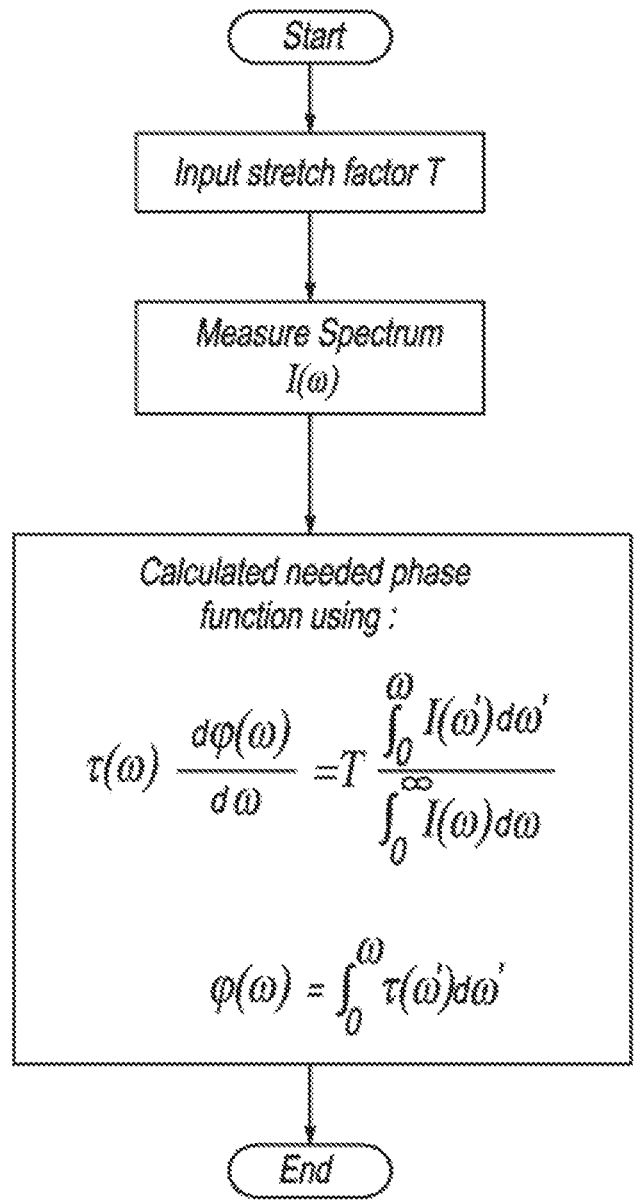
FIG. 13 is a flowchart showing programmed computer software instructions used to determine a required phase to create the square pulse.
Figure 14:
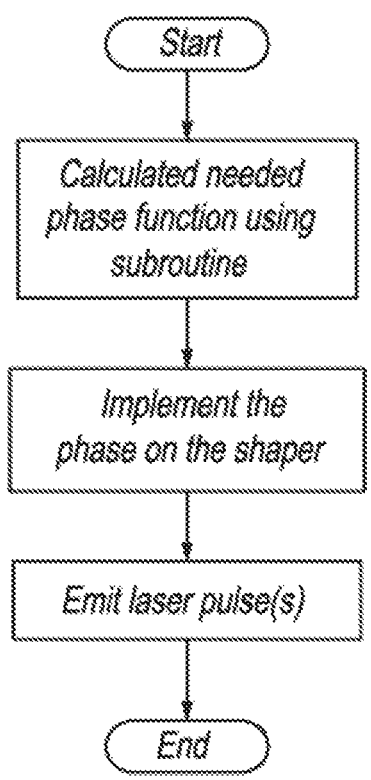
FIG. 14 is a flowchart showing programmed computer software instructions used to create the square pulse using a programmable shaper.

Reference should now be made to the software flow diagrams of FIGS. 13 and 14. The software includes coded instructions programmed in memory of a computer controller 41 (see FIG. 1) which is executed by its microprocessor or other electronics and/or circuitry therein.

Figure 11:
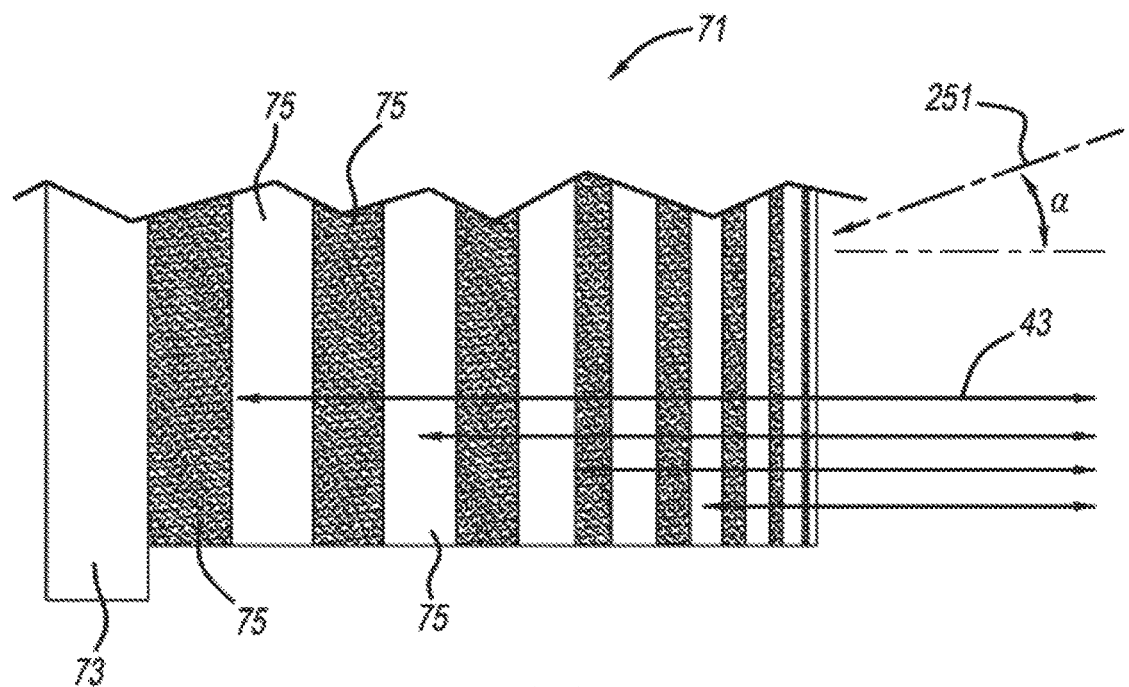
FIG. 11 is a diagrammatic cross-sectional view showing a fixed optic alternate embodiment.

FIG. 13 illustrates an instruction subroutine used by the computer controller to determine the required phase necessary for laser system 19 to create the square pulse. An input stretch factor T is manually (via a keyboard or other input device) or automatically input in the computer controller. The computer controller then automatically measures the pulse spectrum I($\omega$) and, thereafter, the instructions in the microprocessor automatically calculate the desired phase function using one or more of the aforementioned equations. The microprocessor subsequently uses the programmed software instructions of FIG. 14 to implement the phase on adaptive pulse shaper 37, or to be used in the fabrication of a fixed optic such as that shown in FIG. 11. The addition of the calculated phase to the input pulse causes the flat top or square pulse shape to be created on the laser pulses emitted by the seed laser oscillator in a very accurate and fast manner suitable for production use in or outside of a laboratory.

An alternate configuration employs one or more fixed or static optics 71 instead of the previously disclosed programmable or adaptive shaper. In one configuration, optic 71 may be a dielectric mirror including a transparent glass substrate 73 upon which are located multiple, alternate discrete layers of high-index ($TiO_2$) and a low index ($SiO_2$) materials 75. This mirror can be made in accordance with Szipőcs, R., et al., "Theory and Design of Chirped Dielectric Laser Mirrors," Appl, Phys. B 65, 115-135 (1997). The present method and computer controller instructions can be used to determine the appropriate layer thickness and/or other characteristics to manufacture such a fixed dielectric mirror used to create a square and/or flat topped pulse 43 suitable for amplification or transmission through an optical fiber. The mirror layers reflect different frequencies with delays determined by the multilayer structure calculated. It is advantageous that the phase required for creating a square pulse requires less overall dispersion than a phase required for linear chirp. A fixed dielectric mirror can also be designed to have the required phase to recompress a square pulse, the phase required being essentially the complement of the phase used for creating the stretched square pulse.

In another alternate configuration, optic 71 may be a chirped volume Bragg grating ("VBG"). Such a device is generally disclosed in Glebov, L., et al., "Volume-Chirped Bragg gratings: Monolithic Components for Stretching and Compression of Ultrashort Laser Pulses," Opt. Eng. 53(5), 051514 (May 2014). The present VBG grating includes a photo-thermo-refractive ("PTR") glass substrate 73 with multiple layers 75 of a photosensitive optical material that provide a resonant diffraction of the laser pulses. Similar to the mirror optic construction characteristics of the grating optic layers, such as thickness, can be selected and manufactured in accordance with the software calculations of the present method and system. A VBG can also be designed to have the required phase to recompress a square pulse, the phase required being essentially the complement of the phase used for creating the stretched square pulses.

An analytic and computer program-calculated solution to the generation of square pulses in the time domain starting from essentially any arbitrary spectrum is a significant achievement of the present method and system. Self-action depends on the peak intensity of a pulse and that linear chirp may not be the most efficient approach to mitigate undesired self-action processes like self-focusing. Square pulses, however, result in significantly more compact pulses in the time domain than corresponding linearly chirped pulses. Advantageously, the present method, system and software instructions cause essentially no spectral bandwidth loss and can be reversed to obtain the original input pulse by introducing the complementary phase to the one used to stretch the pulse.

The flat top and/or square pulse can be detected and viewed on a very fast oscilloscope preferably having femtosecond resolution, and at least picosecond resolution. Such oscilloscopes are discussed in Sun, P., et al., "Femtosecond Pulse Imaging: Ultrafast Optical Oscilloscope," J. Opt. Soc. Am. A 14, 1159 (May 1997), and Foster, M., et al., "Silicon-Chip-Based Ultrafast Optical Oscilloscope," Nature 456, 81 (Nov. 6, 2008). As viewed on such an oscilloscope, the pulse would turn on fast (with a rise time nearly equal to its original short-pulse duration), its flat top would last for the desired duration length, and it would turn off as fast as its turn on. Alternatively, such a flat top and/or square pulse can be viewed by obtaining a cross-correlation of the pulse (see FIG. 6).

The present method and system cover stretching of the pulses where the amount of stretching is not linear across the spectrum, where the amount of stretching is greater for spectral regions where the intensity of the laser is greater and less stretching on the wings. Furthermore, the present method and system cover square pulse amplification and the associated class of lasers performing the present functions and/or having the characteristics discussed herein. This is contrasted to the prior use of chirp for stretching pulses or prior chirped pulse amplification.

Applications of the present method and system range from an alternative to CPA amplification to other applications where self-action mitigation is important, for example, fiber optic communications (e.g., a transmitter or receiver 45 in FIG. 1) and nonlinear optical imaging using a fiber-based endoscope (alternatively denoted as 45 in FIG. 1), or multiphoton microscope with a femtosecond laser fiber coupled to the microscope. When used for any of these applications (communications, endoscope or multiphoton microscope) the pulses are recompressed at the output. This is ideally done by using square pulse compression mirrors (with the opposite phase as the input). When comparing a chirped pulse to a square pulse with the same peak intensity, the square pulse has a three times smaller temporal dimension, and because it requires less stretching a smaller spectral dimension on the compression grating. Flat top picosecond laser pulses with fast rise and fall times are desirable for the production of high-brightness electron beams for free-electron lasers, Compton scattering light sources, and MeV electron microscopes (alternately referenced as 45 in FIG. 1). There are other scientific applications of the present method and system using pulses with very fast turn on/off, for example, quasi-phase-matched conversion to soft x-ray photon energies, where the fast turn on initiates ionization and the flat top maintains high-peak intensity, and time-resolved coherent anti-Stokes Raman scattering. In an alternate embodiment, the square or flat top pulses produced herein can be made to slant from high to low intensity or vice versa, thereby having a generally trapezoidal shape. Doing so could optimize many other processes where a fast/slow-rise and slow/fast decay are needed.

Figure 12:
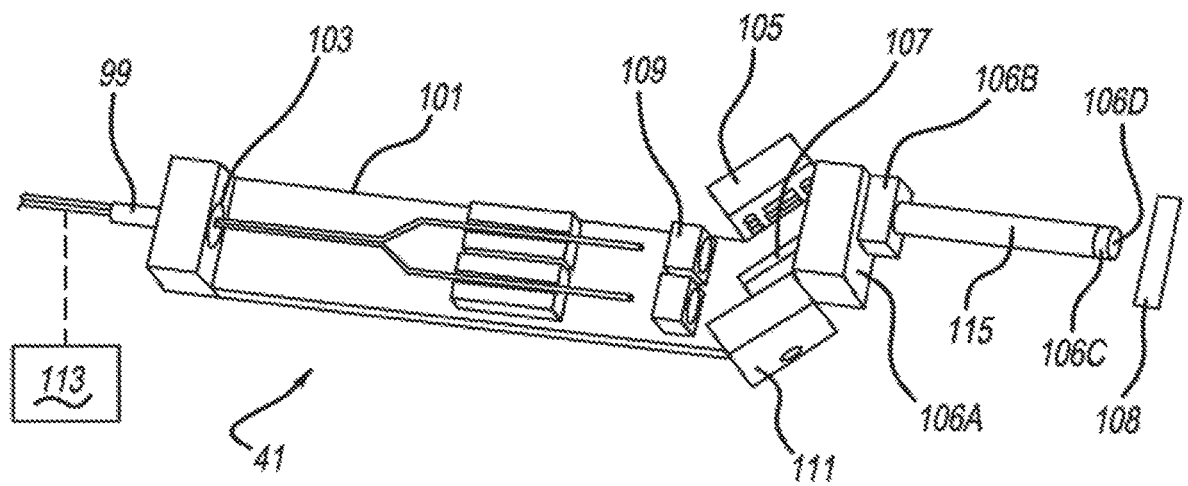
FIG. 12 is a diagrammatic elevational view showing an endoscope employing the laser pulses.

FIG. 12 shows an endoscope, more preferably an endomicroscope 41, used as part of the present system and method. One takes femtosecond pulses, converts them to square stretched pulses, transmits them through the endoscope fiber, the pulses are then recompressed by one or two square-pulse recompression mirrors nearest the endoscope interface with the patient's tissue 108. By using multiple bounces from a square pulse mirror, or using two or more such mirrors one can get greater square pulse stretching. Endomicroscope 41 is of a handheld variety and is coupled to second polarizing beam splitter 33 via a 10× objective lens (f=18 mm) and a one meter long hollow core photonic bandgap fiber ("PBF") 99. Within a housing 101 of endomicroscope 41 is an aspheric lens 103 (f=3 mm) for collimating the pulses, an aluminum coated mirror, a dichroic mirror, and a 2D MEMS scanner 105 at 45° incidence. The endomicroscope further includes four miniature lenses 106A-D to focus the pulses and reverse collect fluorescence generated therefrom, which is then descanned by MEMS scanner 105, reflected by mirror 107 and focused by a lens 109 (f=3 mm) into a one meter long multimode fiber ("MMF") with a core size of 400 mm. Fluorescence is subsequently collimated by another lens (f=15 mm) for focusing by yet another lens (f=60 mm) onto a photomultiplier tube ("PMT") detector. The PMT signal is amplified and the reflection that passes through mirror 107 is reflected by another mirror 111, then focused into PBF 99 which is sent to a photo diode ("PD") detector 113. A stainless steel tube 115 aligns lenses 106A-D and has a length of approximately 26 mm and diameter of approximately 3.4 mm, or a length-to-width ratio of at least 5:1 and more preferably >7:1 to allow in vivo imaging.

FIGS. 15A-18B illustrate a ramp or tapered intensity shape of the laser pulse, in the time domain, for another embodiment of the present invention system and method. The "ramp" pulses are created based on the same approach used to make square pulses described hereinabove but by additionally shifting the position of the phase mask center of the phase mask with respect to the spectrum of the laser. These pulses have a long rise time with very fast decay time, or vice versa. The prior equations (1)-(3) are applicable to both the square and ramped pulses. The following additional equations (4)-(8) are unique for the ramp pulses. Furthermore, equation (4) indicates the magnitude and sign of the shift.

For the ramp pulse 251 and square pulse 43, programmed computer instructions calculate or determine a second derivative of a spectral phase, which is proportional to an intensity of a laser spectrum of the pulse, and then the answer is multiplied by a stretching factor. These software instructions are preferably run in an automatically sensed, calculated, and shaper adjusted manner. Alternately, however, such calculations can be used to manually set shaping optics as will be further discussed hereinafter.

Spectral phase of ramp pulse:

$$\varphi(\omega) = \pm \varphi_S(\omega \pm \tau_0^{-1}) \quad (4)$$

Four different ramp pulse possibilities are:

Rise with positive chirp $\varphi_{Rp}(\omega) = +\varphi_S(\omega + \tau_0^{-1})$ (5)

Rise with negative chirp $\varphi_{Rn}(\omega) = -\varphi_S(\omega - \tau_0^{-1})$ (6)

Decay with positive chirp $\varphi_{Dp}(\omega) = +\varphi_S(\omega - \tau_0^{-1})$ (7)

Decay with negative chirp $\varphi_{Dn}(\omega) = -\varphi_S(\omega + \tau_0^{-1})$ (8)

Figure 15A:
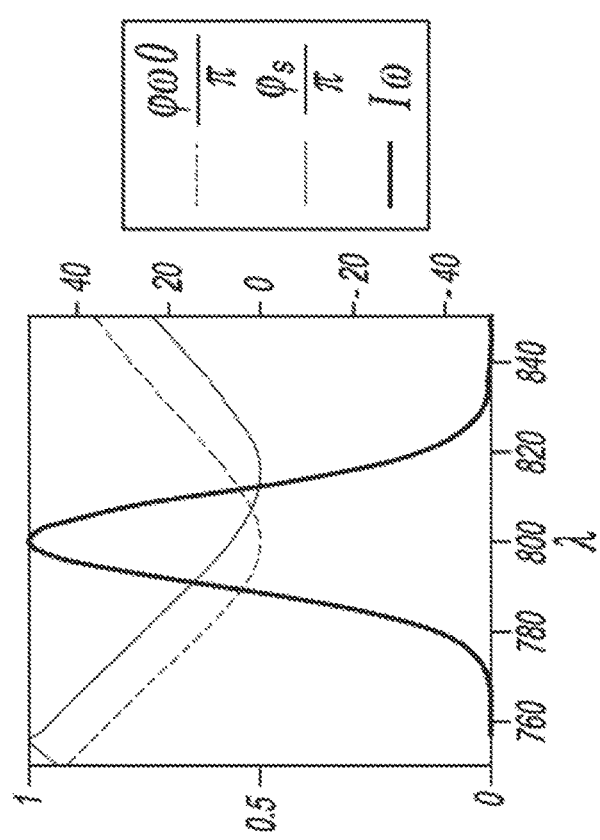
FIGS. 15A and B are graphs showing expected spectrum and time results for a rising ramp pulse with positive chip.

FIG. 15A shows the spectrum of a rising pulse with positive chirp ("Rp") where the solid thick line indicates intensity, the dashed line indicates the square pulse phase and the solid thin line indicates the ramped pulse phase. Intensity units (a.u.) are on the left vertical axis, phase units (rad) are on the right vertical axis and wavelength (nm) is on the bottom horizontal axis. It is noteworthy that the minimum point of the phase for of the ramped pulse is shifted in wavelength from the maximum intensity wavelength of the pulse to approximately the FWHM value.

Figure 15B:
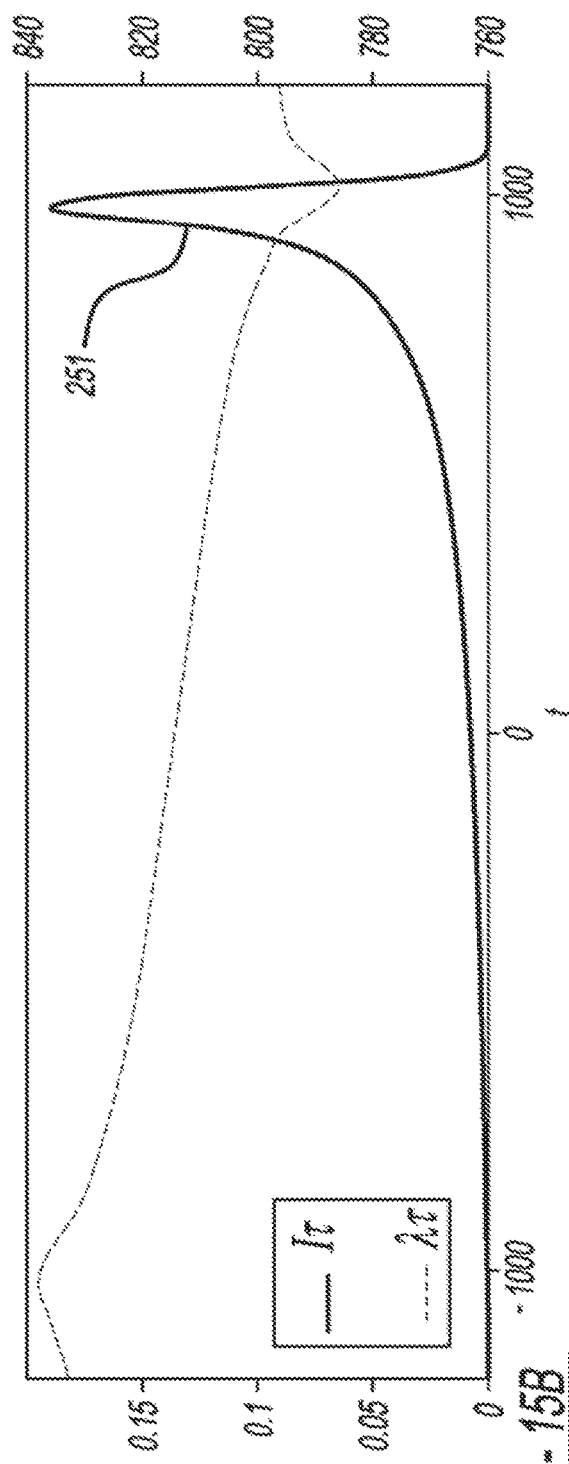
Figure 16A:
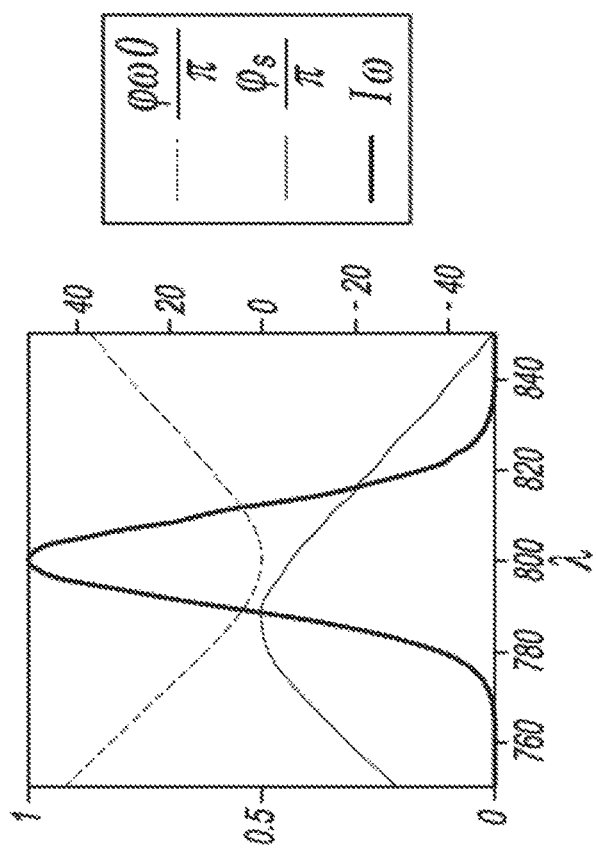
FIGS. 16A and B are graphs showing expected spectrum and time results for a rising ramp pulse with negative chirp.
Figure 16B:
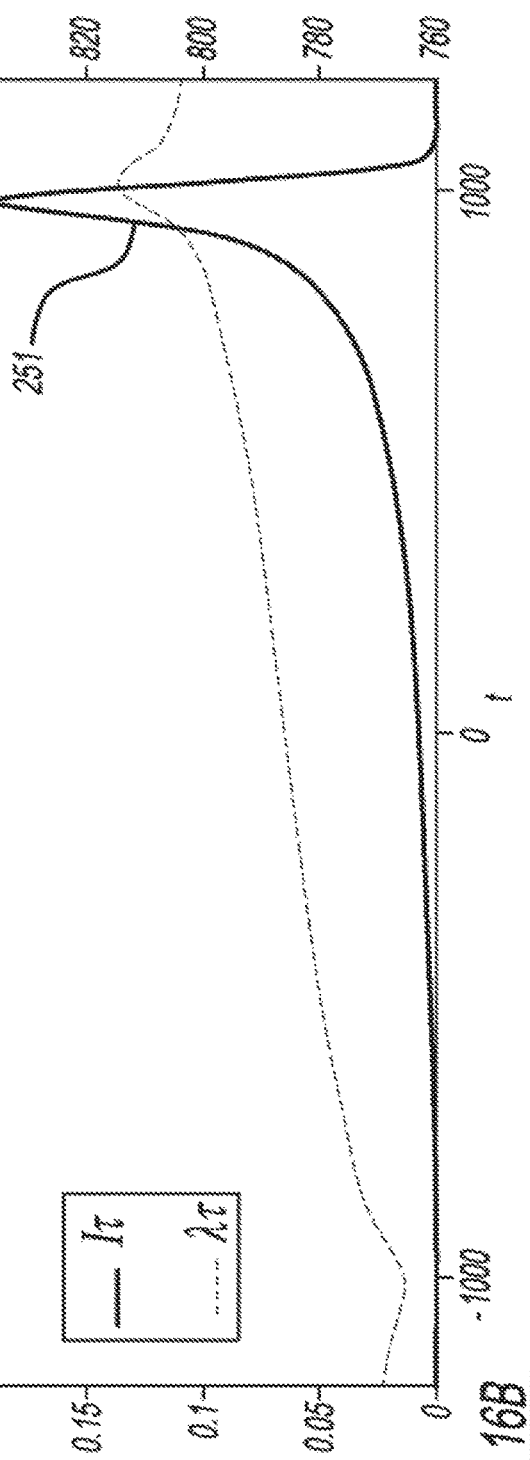

FIG. 15B shows the ramp pulse 251 intensity as a solid thick line and its instantaneous wavelength as a dashed line, in a time domain associated with the Rp situation of FIG. 15A. The instantaneous wavelength is also essentially a time dependent carrier frequency where $\lambda_{max}$ is the wavelength of the ramp pulse as it shifts as a function of time. It should be noted that the ramp pulse intensity created by the present system for the Rp situation has an initially elongated duration and low intensity long-tailed leading curve, followed by a steeply inclining and even more steeply declining central peak, and a much shorter trailing tail. A rising pulse with negative chirp ("Rn") situation is illustrated in the graphs of FIGS. 16A and 16B, with similar designations, created by the present system.

Figure 17A:
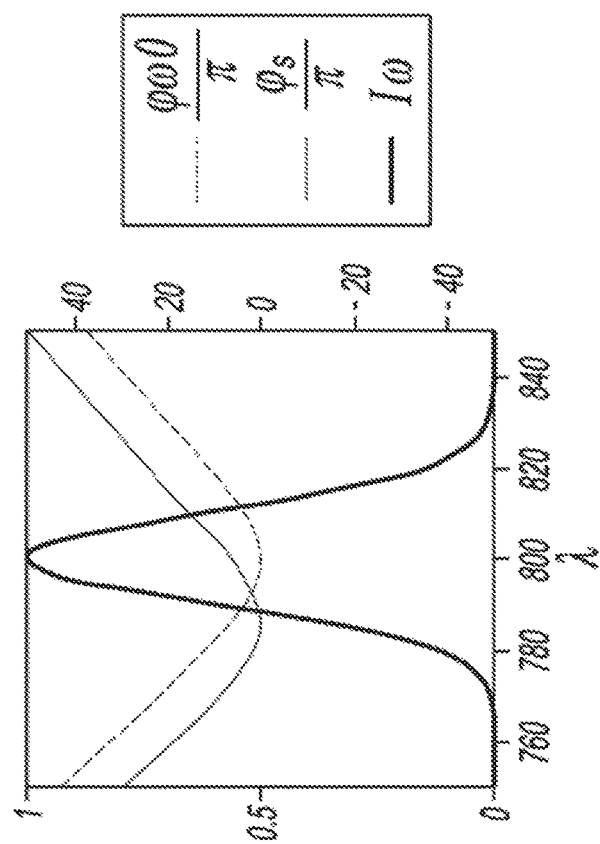
FIGS. 17A and B are graphs showing expected spectrum and time results for a decaying ramp pulse with positive chirp.
Figure 17B:
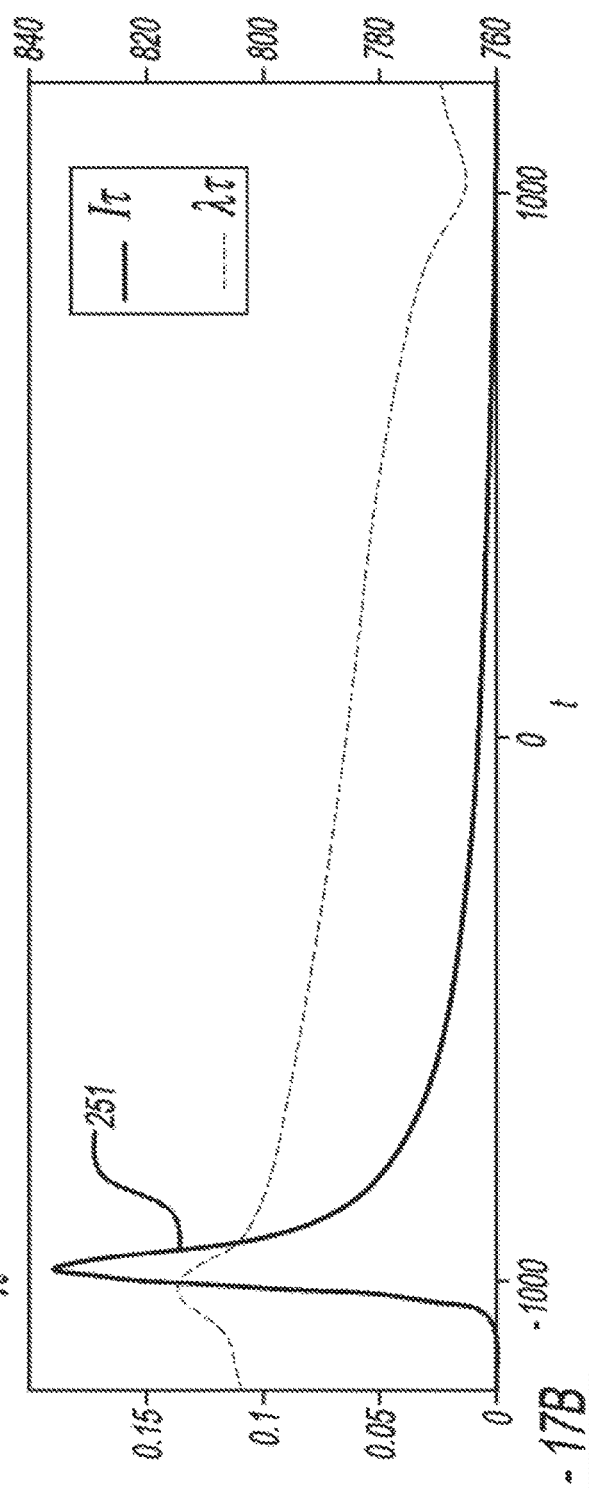
Figure 18A:
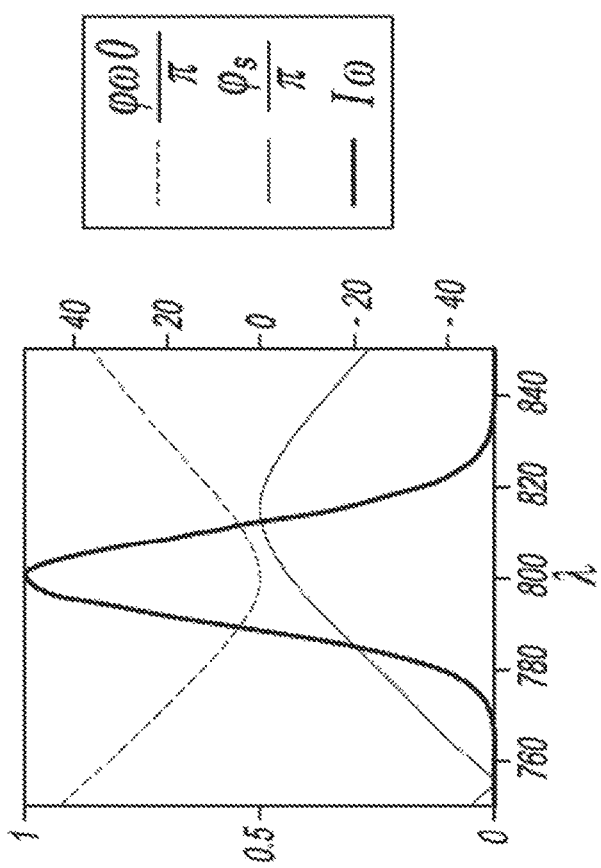
FIGS. 18A and B are graphs showing expected spectrum results for a decaying ramp pulse with negative chirp.
Figure 18B:
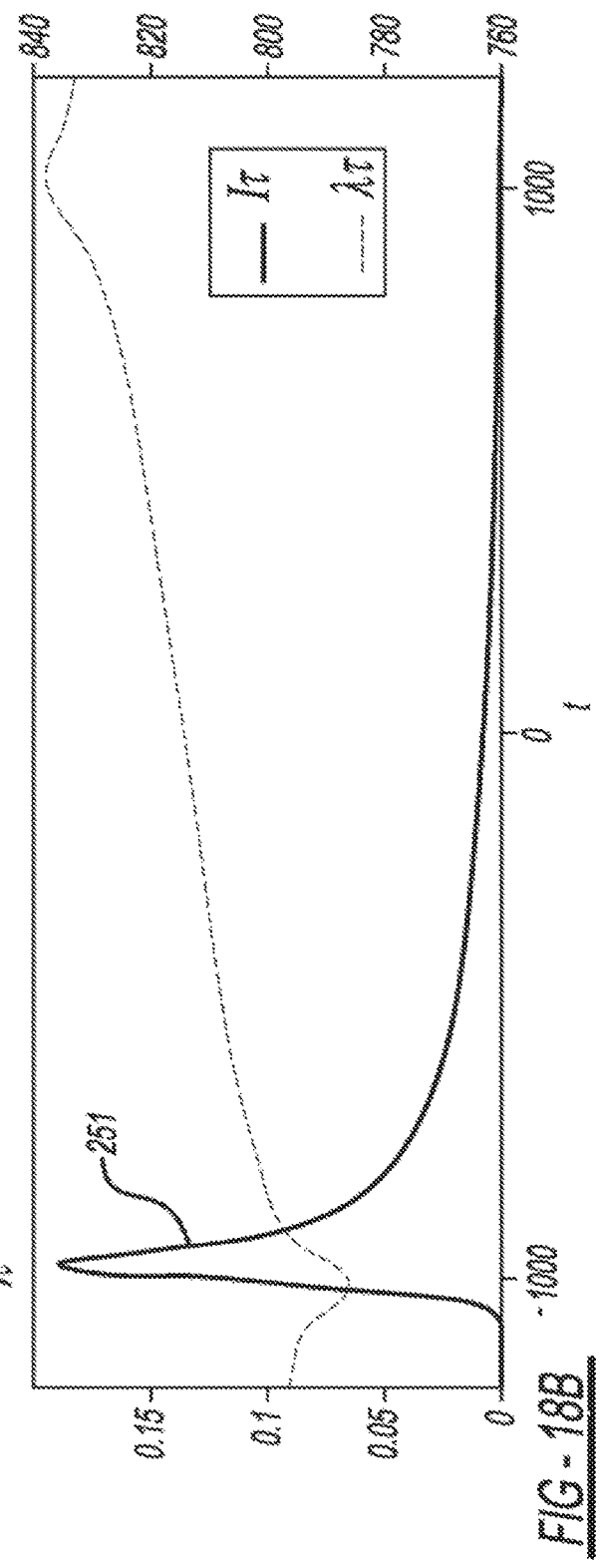

FIGS. 17A and 17B show a decaying pulse with positive chirp ("Dp"). The spectrum of the ramp pulse intensity as observed in FIG. 17A is shown as a solid thin line, the square pulse spectrum is shown as a dashed line and the spectrum of the pulse is shown as a solid thick line. The associated pulse intensities are illustrated in FIG. 17B where the intensity of ramp pulse 251 is shown as a solid thick line and its instantaneous wavelength is shown as a dashed line. The ramp pulse 251 shape has a very short leading tail, followed by a very steep initial peak curve, almost as steep trailing peak curve, and a long-tailed trailing curve. A decaying pulse with negative chirp ("Dn") version is illustrated in the graphs of FIGS. 18A and 18B, with similar designations, created by the present system.

Ramp pulse 251, created by the hardware system and method discussed hereinabove for the square pulse, has certain advantages over prior devices. For example, it is preferably created with only phase modulation to minimize any loss of photonic energy and essentially without a loss of spectrum in the laser pulse. Furthermore, a ramp pulse (Rp, Rn, Dp and/or Dn) advantageously provides very fast ionization of a specimen followed by a prolonged cascading ionization duration (especially with Dp and Dn); this is ideally suited for MALDI or cutting dielectric materials.

Returning to FIG. 11, the exact same fixed or static optics 71 is ideally suited to create square pulse 43 and/or ramp pulse 251. In one version, optic 71 is tilted at an angle α 1-44° offset from perpendicular to a plane of mirrored glass substrate 73. Thus, entering pulse 251 encounters a thicker dimension through layers 75 to create the pre-calculated and pre-set ramp shape characteristics when pulse 251 is reflected back out. But this same optics 71 can be oriented so that a subsequent pulse 43 is perpendicular to the mirrored substrate plane, whereby square pulse 43 is created. Alternately, the optic can be automatically tilted, driven by a computer controlled electromagnetic or piezo-electric actuator. Alternately, optic 71 may be manually or automatically heated in an oven, resistive wire grid, or by another heat source, to cause thickness expansion or contraction of layers 75, whereby the thicker scenario creates ramp pulse 251 and the nominal room temperature or cooled scenario creates square pulse 43. In any of these situations, mechanical characteristic changes by the optic creates either or both types of pulse shapes.

While various constructions of the present method and system have been disclosed, it should be appreciated that other variations can be employed. For example, additional, fewer or alternate optical components can be used although certain benefits may not be realized. Other modifications to the present method and system may still fall within the scope and spirit of the present invention.

The invention claimed is:

1. A method of using a laser pulse, the method comprising:
   (a) emitting a laser pulse;
   (b) measuring a spectrum of the laser pulse with a detector;
   (c) calculating a desired phase function with a controller based at least on the measured spectrum and on a stretching factor; and
   (d) creating at least one of: (i) a flat top, or (ii) steeply sloped intensity versus time ramp peak with only a single long duration tail, for the laser pulse using only phase modulation, using a shaper and/or optic.

2. The method of claim 1, wherein the flat top is created and the flat top pulse creation step is reversible, further comprising recompressing the flat top pulse to obtain essentially an original of the laser pulse before stretching.

3. The method of claim 1, wherein the flat top is created and the flat top creation step avoids a loss of photonic energy in the laser pulse.

4. The method of claim 1, wherein the calculating step further comprises using computer program instructions in the controller to automatically calculate the desired phase function using at least the following equation:

$$\varphi(\omega) = \pm T \frac{\int_0^\omega \int_0^{\omega'} I(\omega'')d\omega''d\omega'}{\int_0^\infty I(\omega')d\omega'}$$

where T is the pulsed duration;
I($\omega$) is the spectral intensity; and
the instructions are stored in tangible and non-transitory computer-readable memory.

5. The method of claim 1, further comprising implementing the desired phase function on the shaper which is an adaptive pulse shaper connected to the controller.

6. The method of claim 1, further comprising implementing the desired phase function on the optic which is a fixed pulse shaper.

7. The method of claim 1, further comprising using the flat top laser pulse in an endoscope.

8. The method of claim 1, further comprising creating the laser pulse with a substantially square shape prior to amplification.

9. The method of claim 1, wherein the steeply sloped ramp peak is created with the long duration tail on a trailing end of the peak, such that it is a decaying pulse with positive chirp.

10. The method of claim 1, wherein the steeply sloped ramp peak is created with the long duration tail on a trailing end of the peak, such that it is a decaying pulse with negative chirp.

11. The method of claim 1, wherein the steeply sloped ramp peak is created with the long duration tail on a leading end of the peak, such that it is a rising pulse with positive chirp.

12. The method of claim 1, wherein the steeply sloped ramp peak is created with the long duration tail on a leading end of the peak, such that it is a rising pulse with negative chirp.

13. The method of claim 1, further comprising using a static mirrored pulse shaper to create both of the flat top and steeply sloped ramp pulses.

14. The method of claim 13, further comprising mechanically changing a characteristic of the pulse shaper to create the flat top pulse versus the steeply sloped ramp pulse.

15. The method of claim 1, wherein the calculating step comprises using computer program instructions in the controller to calculate the desired phase function by calculating a second derivative of a spectral phase, which is proportional to an intensity of the measured spectrum, multiplied by the stretching factor, and the programmed instructions are stored in tangible and non-transitory computer-readable memory.

16. A method of making an optic, the method comprising:
   (a) calculating a desired phase function based at least on the measured spectrum and on a stretching factor of a laser output;
   (b) determining a characteristic of the optic based at least in part on a result from the calculating step; and
   (c) creating the optic so it is adapted to create a flat top laser pulse using only phase modulation, essentially without a loss of photonic energy.

17. The method of claim 16, wherein the optic is a grating in a stretcher.

18. The method of claim 17, wherein the grating is a Bragg grating including a photo-thermo-refractive glass substrate with layers of at least one photosensitive optical material.

19. The method of claim 16, wherein the optic is a dielectric mirror in a stretcher.

20. The method of claim 19, wherein the mirror includes multiple coatings with the varied characteristic including thickness of the coatings.

21. The method of claim 16, wherein the optic is adapted to create the flat top laser pulse using only phase modulation so that the pulse is recompressable without a loss of spectrum.

22. A method of using a laser pulse, the method comprising:
   (a) measuring a spectrum of a laser pulse;
   (b) creating at least one of: (i) a flat top, or (ii) steeply sloped intensity versus time ramp peak with only a single long duration tail, for the laser pulse using only phase modulation; and
   (c) a controller including programmed instructions calculating a desired phase function by determining a second derivative of a spectral phase, which is proportional to an intensity of a measured spectrum of the pulse, multiplied by a stretching factor, the programmed instructions being stored in tangible and non-transitory computer-readable memory.

23. The method of claim 22, further comprising a shaper using only phase modulation to obtain the flat top of the laser pulse in a predictive manner.

24. The method of claim 22, further comprising a grating or mirror recompressing the laser pulse back to essentially its transform limited pulse duration, wherein the laser pulse has one of: (a) a flat top or (b) a steeply sloped ramp peak with only a single long duration tail, in an intensity versus time domain, using only phase modulation to create the pulse shape.

25. The method of claim 22, wherein the flat top is created and the flat top pulse creation step is reversible, further comprising recompressing the flat top pulse to obtain essentially an original of the laser pulse before stretching.

26. The method of claim 22, wherein the flat top is created and the flat top creation step avoids a loss of photonic energy in the laser pulse.

27. The method of claim 22, wherein the calculating step further comprises using the programmed instructions in the controller to automatically calculate the desired phase function using at least the following equation:

$$\varphi(\omega) = \pm T \frac{\int_0^\omega \int_0^{\omega'} I(\omega'')d\omega'' d\omega'}{\int_0^\infty I(\omega')d\omega'}$$

where T is the pulsed duration; and

I(ω) is the spectral intensity.

28. The method of claim 22, further comprising implementing the desired phase function on a shaper which is an adaptive pulse shaper connected to the controller.

29. The method of claim 22, further comprising implementing the desired phase function on a fixed pulse shaper.

30. The method of claim 22, further comprising using the flat top laser pulse in an endoscope.

31. The method of claim 22, further comprising creating the laser pulse with a substantially square shape prior to amplification.

32. The method of claim 22, wherein the steeply sloped ramp peak is created with the long duration tail on a trailing end of the peak, such that it is a decaying pulse with positive chirp.

33. The method of claim 22, wherein the steeply sloped ramp peak is created with the long duration tail on a trailing end of the peak, such that it is a decaying pulse with negative chirp.

34. The method of claim 22, wherein the steeply sloped ramp peak is created with the long duration tail on a leading end of the peak, such that it is a rising pulse with positive chirp.

35. The method of claim 22, wherein the steeply sloped ramp peak is created with the long duration tail on a leading end of the peak, such that it is a rising pulse with negative chirp.

36. The method of claim 22, further comprising:
(a) a laser emitting the laser pulse;
(b) a stretcher and/or grating stretching the laser pulse;
(c) an amplifier amplifying the stretched laser pulse;
(d) a shaper located downstream of the amplifier; and
(e) the shaper causing the laser pulse to have the flat top in a time domain when recompressed.

37. The method of claim 1, further comprising:
(a) a laser emitting the laser pulse;
(b) a stretcher and/or grating stretching the laser pulse;
(c) an amplifier amplifying the stretched laser pulse;
(d) a shaper located downstream of the amplifier; and
(e) the shaper causing the laser pulse to have the flat top in a time domain when recompressed.

* * * * *